United States Patent
Ray et al.

(10) Patent No.: US 8,750,232 B2
(45) Date of Patent: Jun. 10, 2014

(54) UTILITY MAXIMIZATION SCHEDULER FOR BROADBAND WIRELESS COMMUNICATION SYSTEMS

(75) Inventors: Siddharth Ray, San Diego, CA (US); Ritesh K. Madam, San Diego, CA (US); Ashwin Sampath, San Diego, CA (US); Sundeep Rangan, San Diego, CA (US); Arnab Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 13/556,468

(22) Filed: Jul. 24, 2012

(65) Prior Publication Data
US 2012/0294258 A1    Nov. 22, 2012

Related U.S. Application Data

(62) Division of application No. 12/783,467, filed on May 19, 2010.

(60) Provisional application No. 61/180,666, filed on May 22, 2009.

(51) Int. Cl.
*H04W 28/04*    (2009.01)

(52) U.S. Cl.
USPC .......................................... 370/329

(58) Field of Classification Search
USPC .......... 370/252, 336, 349, 328, 468, 338, 437
See application file for complete search history.

(56) References Cited

U.S. PATENT DOCUMENTS

| | | | |
|---|---|---|---|
| 6,985,462 B2 * | 1/2006 | Hosein | 370/329 |
| 6,987,738 B2 * | 1/2006 | Subramanian et al. | 370/252 |
| 7,706,406 B2 * | 4/2010 | Jang | 370/469 |
| 7,778,247 B2 | 8/2010 | Green | |
| 7,839,830 B2 | 11/2010 | Sang et al. | |
| 7,843,832 B2 | 11/2010 | Choi et al. | |
| 8,165,152 B2 * | 4/2012 | Sammour et al. | 370/437 |
| 2004/0258026 A1 | 12/2004 | Lau | |
| 2006/0159098 A1 | 7/2006 | Munson et al. | |
| 2006/0209721 A1 | 9/2006 | Mese et al. | |
| 2006/0242319 A1 | 10/2006 | Sang et al. | |
| 2007/0076651 A1 | 4/2007 | Chheda et al. | |
| 2007/0270175 A1 | 11/2007 | Malladi et al. | |
| 2008/0002733 A1 | 1/2008 | Sutskover | |

(Continued)

FOREIGN PATENT DOCUMENTS

WO    03032586    4/2003

OTHER PUBLICATIONS

Hosein, et al: "Simple fairness metric for time-shared wireless data networks," Personal Wireless Communications, 2005. ICPWC 2005 IEEE Intl IONAL Conference, New Delhi, India, Jan. 23-25, 2005. IEEE, Piscataway, NJ, US, Jan. 23, 2005, pp. 34-37, ISBN: 978-0-7803-8964-9.

(Continued)

*Primary Examiner* — Yemane Mesfin
*Assistant Examiner* — Derrick V Rose
(74) *Attorney, Agent, or Firm* — Nerrie M. Zohn

(57) ABSTRACT

Certain aspects of the present disclosure relate to a technique of designing a Media Access Control (MAC) scheduler for uplink communication in high rate wireless data systems, such as Long Term Evolution (LTE) wireless communication systems.

24 Claims, 7 Drawing Sheets

(56) References Cited

U.S. PATENT DOCUMENTS

| | | |
|---|---|---|
| 2008/0056184 A1 | 3/2008 | Green |
| 2008/0137537 A1 | 6/2008 | Al-Manthari et al. |
| 2008/0188260 A1 | 8/2008 | Xiao et al. |
| 2008/0219145 A1 | 9/2008 | Sundaresan et al. |
| 2008/0225693 A1 | 9/2008 | Zhang et al. |
| 2008/0268833 A1 | 10/2008 | Huang et al. |
| 2009/0082028 A1 | 3/2009 | Hosein et al. |
| 2009/0116390 A1* | 5/2009 | Madan et al. ............ 370/235 |
| 2009/0116439 A1 | 5/2009 | Madan et al. |
| 2009/0116507 A1 | 5/2009 | Kanda |
| 2009/0201884 A1 | 8/2009 | Chaponniere |
| 2009/0257389 A1 | 10/2009 | Mohanty et al. |
| 2010/0238885 A1 | 9/2010 | Borran et al. |
| 2011/0128921 A1 | 6/2011 | Ray et al. |
| 2012/0033633 A1 | 2/2012 | Spinar et al. |

OTHER PUBLICATIONS

International Search Report and Written Opinion—PCT/US2010/035866, International Search Authority—European Patent Office—Dec. 8, 2010.

* cited by examiner

UTILITY MAXIMIZATION SCHEDULER FOR BROADBAND WIRELESS COMMUNICATION SYSTEMS

CLAIM OF PRIORITY UNDER 35 U.S.C. §119 AND §120

The present application is a divisional application of U.S. Ser. No. 12/783,467, filed May 19, 2010, entitled "Utility Maximization Scheduler For Broadband Wireless Communication Systems" which claims priority to U.S. Provisional Patent Application Ser. No. 61/180,666, filed May 22, 2009, entitled "Utility Maximization Scheduler for Broadband Wireless Communication Systems" and assigned to the assignee hereof and hereby expressly incorporated by reference herein.

BACKGROUND

1. Field

Certain aspects of the present disclosure generally relate to wireless communications and, more particularly, to a method of designing Media Access Control (MAC) scheduler for uplink communication in high rate wireless data systems, with specific application to Long Term Evolution (LTE) systems.

2. Background

Wireless communication systems are widely deployed to provide various types of communication content such as voice, data, and so on. These systems may be multiple-access systems capable of supporting communication with multiple users by sharing available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

A scheduler can be designed within a base station to allocate uplink communication resources to a mobile terminal in a sector served by the base station. The allocation may be based on channel conditions, an amount of interference the mobile terminal causes to other neighboring sectors, quality of service (QoS) constraints of a traffic that the mobile terminal requests to transmit, and delayed information about a buffer state at the mobile terminal made available to the serving base station. In particular, the scheduler may need to provide a fair rate allocation to all served mobile terminals. For example, mobile terminals at a cell edge should be assigned to a relatively lower transmission rate, but they also should not be starved all the time.

The $3^{rd}$ generation (3G) and $4^{th}$ generation (4G) wireless cellular systems can typically serve a large number of flows with diverse requirements. Also, in the 4G wireless systems, scheduling decisions may be made approximately every millisecond, and spectral resources may be distributed among different mobile terminals with a high granularity. Hence, it may be desirable that computing of scheduling decisions is efficient, in addition to ensuring fairness among the mobile terminals.

Prior art approaches to the above issues rely on one or both of the following techniques to reduce the computational complexity of scheduling algorithm.

In one aspect, the reduction of scheduling complexity may be based on a strict prioritization among flow classes. Classes of flows (where a class may depend on negotiated QoS) may be scheduled in the order of importance, i.e., more important classes may have a higher scheduling priority. Then, during each scheduling instance transmission packets associated with higher priority flows may be served before transmission packets associated with lower priority flows. This may be performed irrespective of channel and interference conditions associated with mobile terminals to which the flows belong. However, this approach may be highly suboptimal because it may not exploit multiuser diversity nor it may ensure fairness among the mobile terminals.

In another aspect, the reduction of scheduling complexity may be based on a greedy scheduling in an order of current priority. Priority of all flows may be computed based on a current buffer state and a channel state associated with a served mobile terminal. Then, the flows may be served in decreasing order of priority. Once a flow is chosen, enough bandwidth may be allocated either to empty the buffer or to use a maximum power at the mobile terminal, which may be limited by the device transmit power or intra/inter-cell interference constraints. However, this approach may be also highly suboptimal because all transmission packets in the buffer may usually have different priorities. For example, a flow may obtain a high priority only because a fraction of packets belonging to that flow may have the high priority.

SUMMARY

Certain aspects provide a method for wireless communications. The method generally includes scheduling, among a plurality of users served by an apparatus based on at least one of a defined utility function, a maximum transmit power or a maximum transmit power spectral density (PSD) for each of the users, power and bandwidth resources of an uplink between the users and the apparatus, and selecting, based on at least one of channel conditions, traffic priorities, marginal utility functions or expected transmitting rates associated with the users, at least one of the users for transmitting data to the apparatus using at least a portion of the scheduled uplink resources.

Certain aspects provide an apparatus for wireless communications. The apparatus generally includes means for scheduling, among a plurality of users served by the apparatus based on at least one of a defined utility function, a maximum transmit power or a maximum transmit power spectral density (PSD) for each of the users, power and bandwidth resources of an uplink between the users and the apparatus, and means for selecting, based on at least one of channel conditions, traffic priorities, marginal utility functions or expected transmitting rates associated with the users, at least one of the users for transmitting data to the apparatus using at least a portion of the scheduled uplink resources.

Certain aspects provide an apparatus for wireless communications. The apparatus generally includes a scheduler configured to schedule, among a plurality of users served by the apparatus based on at least one of a defined utility function, a maximum transmit power or a maximum transmit power spectral density (PSD) for each of the users, power and bandwidth resources of an uplink between the users and the apparatus, and a circuit configured to select, based on at least one of channel conditions, traffic priorities, marginal utility functions or expected transmitting rates associated with the users, at least one of the users for transmitting data to the apparatus using at least a portion of the scheduled uplink resources.

Certain aspects provide a computer-program product for wireless communications comprising a computer readable medium having instructions stored thereon, the instructions being executable by one or more processors. The instructions generally include instructions for scheduling, among a plurality of users served by an apparatus based on at least one of a defined utility function, a maximum transmit power or a maximum transmit power spectral density (PSD) for each of the users, power and bandwidth resources of an uplink between the users and the apparatus, and instructions for selecting, based on at least one of channel conditions, traffic priorities, marginal utility functions or expected transmitting rates associated with the users, at least one of the users for transmitting data to the apparatus using at least a portion of the scheduled uplink resources.

Certain aspects provide an apparatus for wireless communications. The apparatus generally includes at least one processor configured to schedule, among a plurality of users served by the apparatus based on at least one of a defined utility function, a maximum transmit power or a maximum transmit power spectral density (PSD) for each of the users, power and bandwidth resources of an uplink between the users and the apparatus, and select, based on at least one of channel conditions, traffic priorities, marginal utility functions or expected transmitting rates associated with the users, at least one of the users for transmitting data to the apparatus using at least a portion of the scheduled uplink resources, and a memory coupled to the at least one processor.

Certain aspects provide a method for wireless communications. The method generally includes scheduling, among a plurality of logical channels (LCs), packets for transmission over the LCs based at least in part on a defined utility function for each of the LCs, wherein the utility function is based on at least one of Quality of Service (QoS) parameters of that LC or a priority of that LC relative to one or more other priorities of one or more other LCs of the plurality of LCs.

Certain aspects provide an apparatus for wireless communications. The apparatus generally includes means for scheduling, among a plurality of logical channels (LCs), packets for transmission over the LCs based at least in part on a defined utility function for each of the LCs, wherein the utility function is based on at least one of Quality of Service (QoS) parameters of that LC or a priority of that LC relative to one or more other priorities of one or more other LCs of the plurality of LCs.

Certain aspects provide an apparatus for wireless communications. The apparatus generally includes a scheduler configured to schedule, among a plurality of logical channels (LCs), packets for transmission over the LCs based at least in part on a defined utility function for each of the LCs, wherein the utility function is based on at least one of Quality of Service (QoS) parameters of that LC or a priority of that LC relative to one or more other priorities of one or more other LCs of the plurality of LCs.

Certain aspects provide a computer-program product for wireless communications comprising a computer readable medium having instructions stored thereon, the instructions being executable by one or more processors. The instructions generally include instructions for scheduling, among a plurality of logical channels (LCs), packets for transmission over the LCs based at least in part on a defined utility function for each of the LCs, wherein the utility function is based on at least one of Quality of Service (QoS) parameters of that LC or a priority of that LC relative to one or more other priorities of one or more other LCs of the plurality of LCs.

Certain aspects provide an apparatus for wireless communications. The apparatus generally includes at least one processor configured to schedule, among a plurality of logical channels (LCs), packets for transmission over the LCs based at least in part on a defined utility function for each of the LCs, wherein the utility function is based on at least one of Quality of Service (QoS) parameters of that LC or a priority of that LC relative to one or more other priorities of one or more other LCs of the plurality of LCs, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
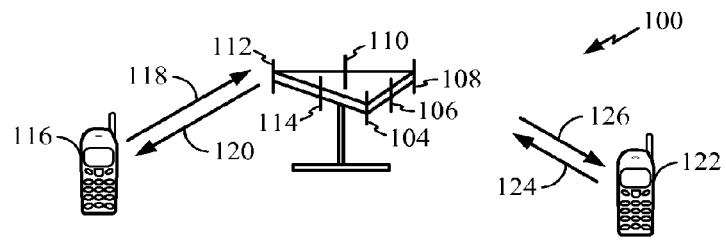
FIG. 1 illustrates an example multiple access wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile terminal, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
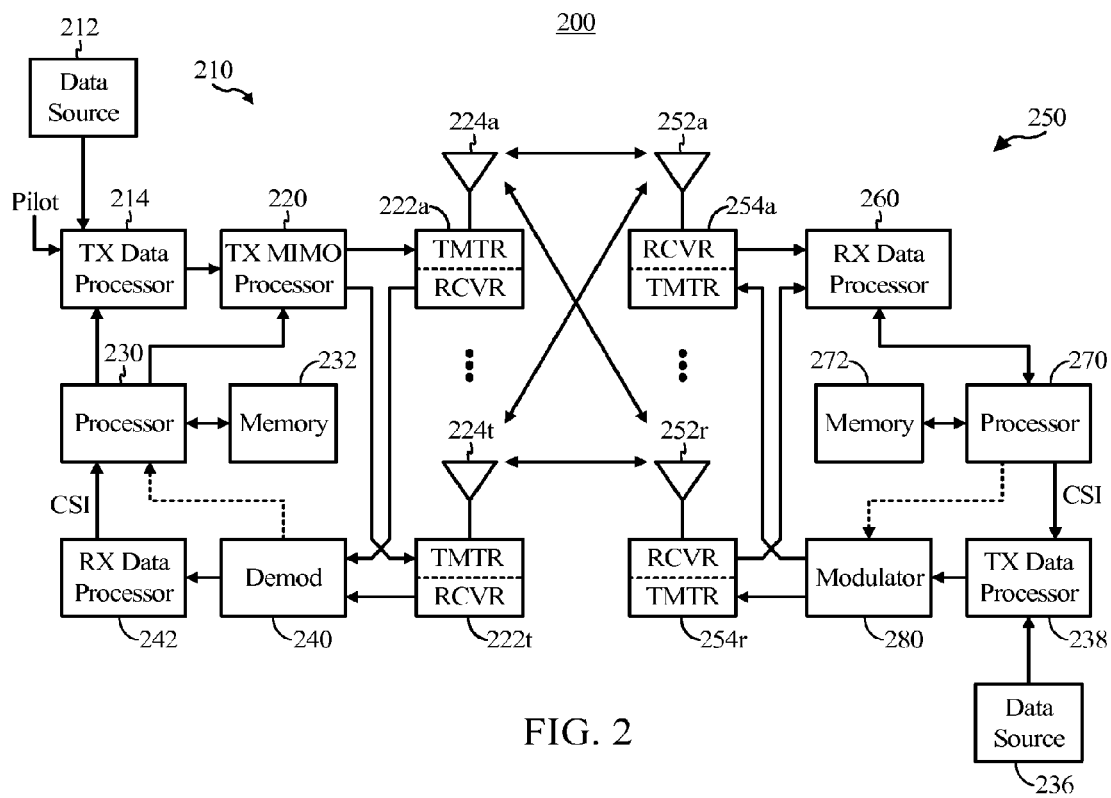
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

Figure 3:
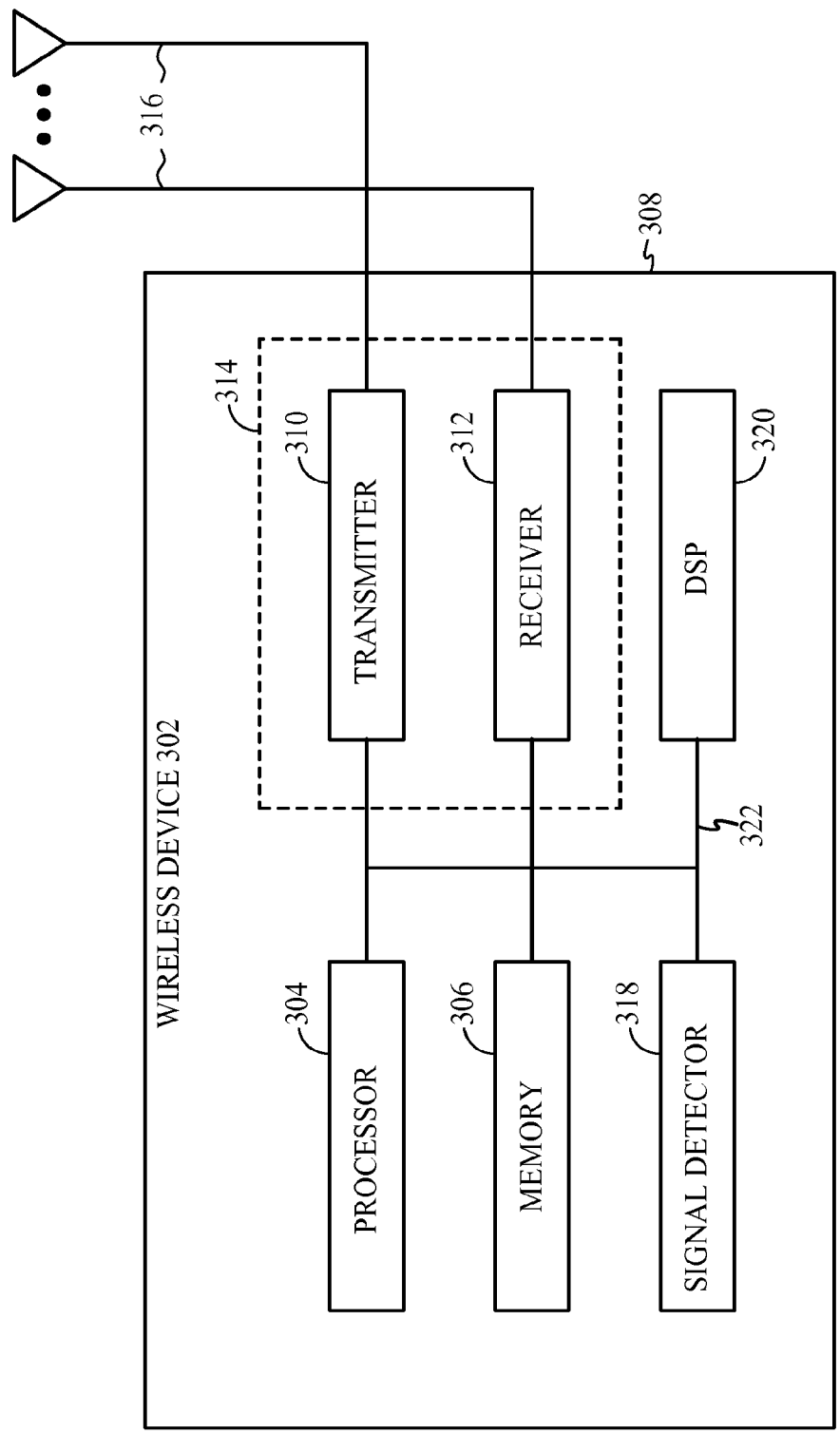
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Certain aspects of the present disclosure support designing a transmission scheduler operating within a base station of a wireless communication system, such as the multiple access wireless communication system illustrated in FIG. 1. Based on provided information and a defined utility function, the scheduler may allocate uplink communication resources for mobile terminals within a coverage area of the base station.

Uplink Scheduler Based on Utility Maximization

Figure 4:
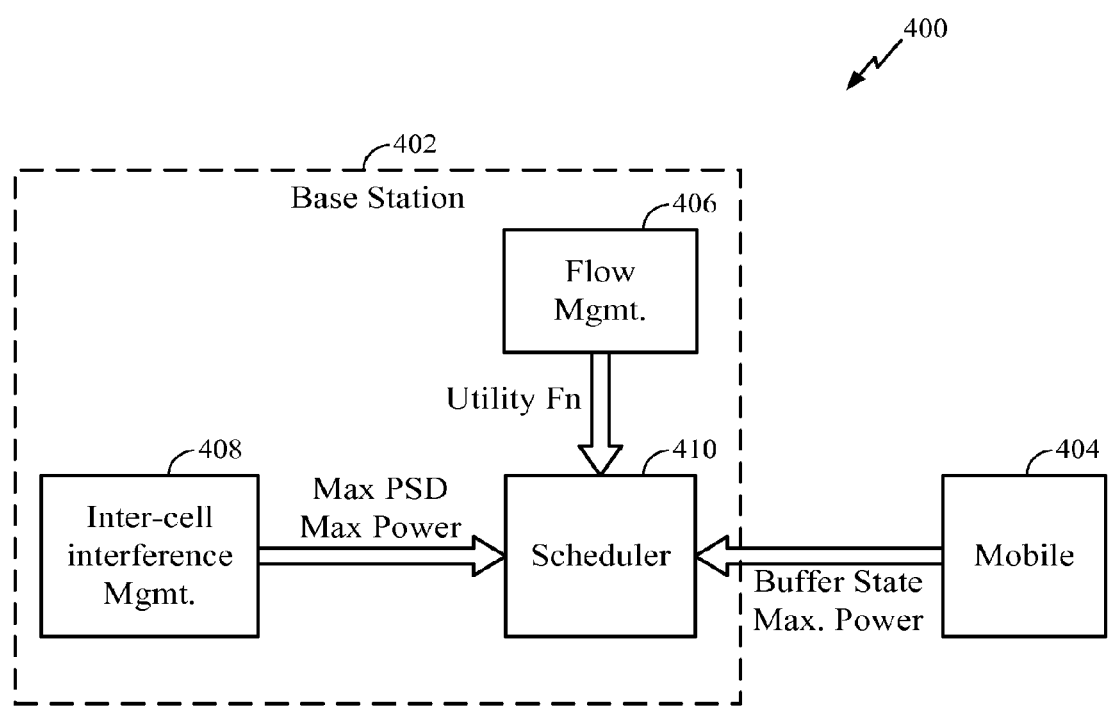
FIG. 4 illustrates an example uplink scheduling framework in accordance with certain aspects of the present disclosure.

FIG. 4 illustrates an example uplink scheduling framework 400 in accordance with certain aspects of the present disclosure. A flow management unit 406 of a base station 402 may group connections/applications with similar Quality of Service (QoS) requirements into a single flow. This unit may also select a utility function for that flow. The utility function may characterize usefulness of a rate allocation (e.g., allocation of a short-term rate) to the flow in a transmission slot. A mapping from the rate allocation to the utility to the flow may also depend on an average rate the flow has been served in the past, on delays of various packets in the flow, a queue length and a buffer state of a mobile terminal 404.

The flow management unit 406 may communicate to flows of a scheduler 410. The flows of the scheduler 410 may be constantly added or deleted, and the management unit 406 may also update on a utility function associated with a given flow. An inter-cell interference management block 408 may be employed to manage interference caused by mobile terminals in a sector served by the base station 402 to one or more other users in one or more neighboring sectors served by other base stations. Using a feedback from the neighboring sectors (i.e., a level of interference), the interference management block 408 may adapt on a slow time scale transmission characteristics of the mobile terminals in the sector, such as to maximize a power at which each of the mobile terminals may transmit and to maximize a power spectral density (PSD) on any given resource block.

The mobile terminal 404 served by the base station 402 may feed back information about its buffer state and its power headroom to the scheduler 410. The power headroom may be translated into a maximum power at which the mobile terminal 404 can transmit. The scheduler 410 may grant spectral resources to mobile terminals (typically in every slot), and it may select the rate and power at which the mobile terminals may transmit. The allocations may be made so as to maximize a sum of utilities subject to constraints given by, for example, the inter-cell interference management block 408. Therefore, information available to the scheduler 410 may comprise at least one of: the interference constraints, the buffer state, or the power headroom. To limit interference to the neighboring sectors, the mobile terminal 404 may be constrained to transmit on the uplink below a certain power and/or a certain PSD.

A number of bytes in the mobile terminal's buffer (and potentially other information such as packets delays) may be periodically conveyed from the mobile terminal 404 to the scheduler 410. An average rate allocated to a transmission flow of the mobile terminal 404 may be computed at the scheduler 410. The mobile terminal 404 may also inform the base station 402 about the power headroom, which may be directly converted into a maximum transmission power of the mobile terminal. The power headroom may be utilized to compute the maximum power that the mobile terminal 404 can transmit at due to its physical constraints.

Thus, the scheduler 410 may only make assignments which satisfy the maximum PSD requirement and the maximum power requirement. This may be translated into a function which maps the bandwidth assigned in a transmission slot to a spectral efficiency. This may be feasible because the spectral efficiency may be a non-increasing concave function of the assigned bandwidth. In addition, the scheduler 410 may not assign the bandwidth more than necessary to drain the buffer of a given flow.

The scheduler 410 may compute the bandwidth allocation to each flow over one or more frames to maximize a sum of the utilities across the flows. This computation may typically limit a number of mobile terminals scheduled to transmit at any given time to only a subset of the number of mobile terminals operating within a range of a base station. As a result, in one aspect, only a subset of the mobile terminals operating within range of the base station may be selected for transmission based on associated channel conditions and traffic priority in any given time period. In another aspect, a subset of mobile terminals out of the total number of mobile terminals operating within range of the base station may be selected for transmission in any given time period based on a marginal utility and an expected rate of communication, as described below in greater details.

The bandwidth allocation may be written as the following optimization problem:

$$\max\left\{\sum_i U_i(r_i(b_i))\right\}, \text{ such that } \sum_i b_i = B, b_i \leq B_i^{max}, \forall i, \quad (1)$$

where $r_i$ is the function which may translate the bandwidth allocation into an effective transmission rate, $B_i^{max}$ is the maximum bandwidth that may be utilized by a flow i to drain its entire buffer, $U_i$ is the utility function which may translate the transmission rate into a utility, B is the total bandwidth which may need to be distributed, and $b_i$ is the amount of bandwidth to be allocated to the flow i.

The optimization problem given by equation (1) may be efficiently solved using a bisection search algorithm described in the Appendix of this disclosure.

There may be a broad class of utility functions for which the above optimization problem may be efficiently solved. Specifically, for concave functions of the rate, the optimal resource allocation may be computed very fast. Several utility functions, such as rate based functions, queue length based functions, as well as a utility function based on transmission packet delays may satisfy this property.

In the case of rate based utility function, the utility or the user experience may be a function of an average rate obtained by a flow over a certain time horizon. If the rate is higher, then the utility may also be higher. Such a utility function may be more relevant to best-effort packet flows without rate guarantees, e.g., in File Transfer Protocol (FTP) and Hypertext Transfer Protocol (HTTP) applications.

The queue length based utility function may be a function of a number of bytes in a state buffer of a mobile terminal. If the number of bytes is lower, then the utility may be higher. Such a utility function may be more relevant to latency sensitive flows with no rate control. In this case, a larger queue length may usually translate into a higher latency.

Rather than the queue length (which may indirectly indicate a level of latency), the utility function may depend on a delay in transmitting and/or receiving packets between a mobile terminal and a base station. Alternatively, the utility function may be based on a delay measured by the mobile terminal from a moment in time when data are available for transmission to another moment in time when the data are actually transmitted.

In the optimization problem given by equation (1), the function $r_i(b_i)$ may represent the rate a mobile terminal i can achieve as a function of the bandwidth allocation $b_i$. This function may capture the maximum transmit power constraint at the mobile terminal, as well as the maximum transmit power PSD imposed by an inter-cell interference management algorithm/module of a serving base station.

In one aspect of the present disclosure, the allocation of resources may be computed for transmission in multiple sub-frames. A scheduler may be split into background and foreground processes. The background process may essentially involve solving the above optimization problem over multiple sub-frames (i.e., over a horizon), while the foreground process may allocate resources in each sub-frame such that over the horizon the allocation may satisfy a solution of the above optimization problem.

The function $r_i$ from equation (1) may depend on the number of assignments made to the mobile terminal i during the horizon (i.e., for duration of the sub-frames) since the power constraint at the mobile terminal may be per sub-frame. In other words, during any given sub-frame, the mobile terminal may not transmit using more than the maximum allowable transmit power. For cell-edge mobile terminals, computing of the function $r_i$ (i.e., the achievable rate) may be more dependant on a number of assignments. Such mobile terminals may be typically link-budget limited. For the computation of $r_i$, it can be assumed that in one assignment the mobile terminal may be assigned at most M resource blocks (RBs) such that a spectral efficiency for transmission over one RB may be at most twice as a spectral efficiency for transmission over the M RBs.

In another aspect of the present disclosure, the allocation of resources may be computed over multiple sub-bands. In LTE, a mobile terminal may transmit on an uplink by only employing contiguous frequency resources. Hence, the mobile terminal may be assigned frequency resources in only one sub-band. Moreover, the function $r_i$ from the optimization problem given by equation (1) may need to be redefined for a mobile terminal i and a sub-band s, i.e., a function $r_{is}$ may replace the function $r_i$ in equation (1). This may be because interference constraints on each frequency sub-band may be different. Then, by solving the optimization problem from equation (1) it may be computed what portion of resources each user may be assigned on every frequency sub-band. After that, a heuristic may be applied where the user may be assigned resources only on a frequency sub-band on which it is assigned the largest bandwidth resource among all sub-bands.

Figure 5:
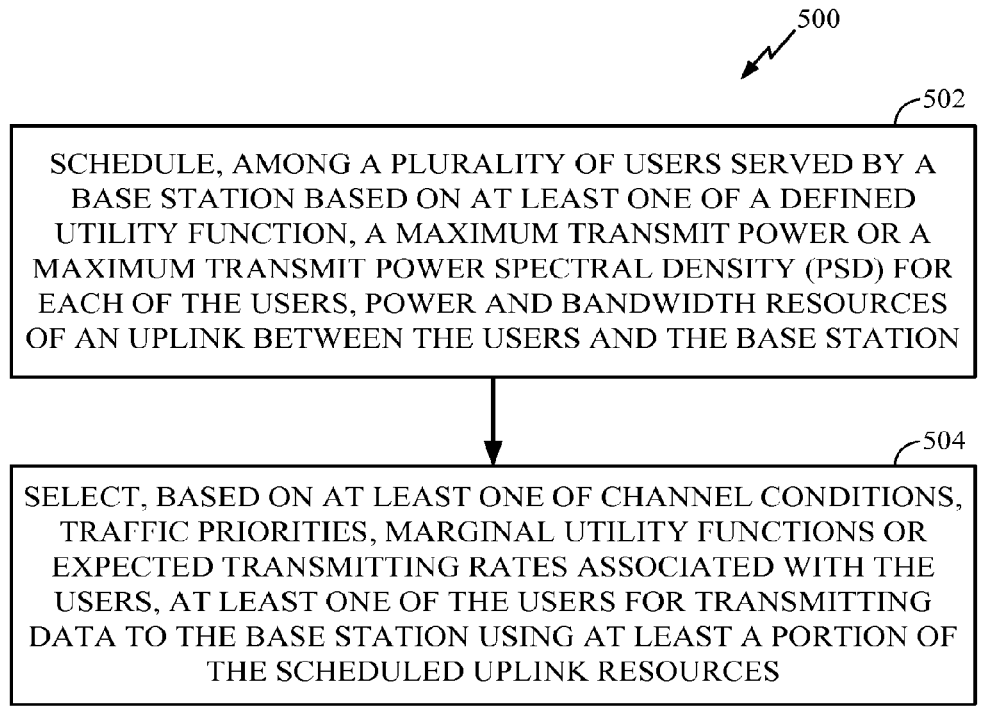
FIG. 5 illustrates example operations that may be executed at a base station for scheduling uplink transmission resources in accordance with certain aspects of the present disclosure.

FIG. 5 illustrates example operations 500 that may be executed at a base station for scheduling uplink transmission resources in accordance with certain aspects of the present disclosure. At 502, the base station may schedule, among a plurality of users served by the base station based on at least one of a defined utility function, a maximum transmit power or a maximum transmit power spectral density (PSD) for each of the users, power and bandwidth resources of an uplink between the users and the base station. At 504, the base station may select, based on at least one of channel conditions, traffic priorities, marginal utility functions or expected transmitting rates associated with the users, at least one of the users for transmitting data to the base station using at least a portion of the scheduled uplink resources. The resources may be scheduled for transmitting in one or more sub-frames from each of the at least one selected user. An achievable rate of transmitting in the sub-frames may depend on a number of assignments associated with the user for duration of the sub-frames. The scheduled power resources may comprise a maximum allowable transmit power for each of the sub-frames.

Choice of Utility Functions Based on Average Rate

Certain aspects of the present disclosure support choosing utility functions for scheduling uplink resources based on average rates of corresponding packet flows. In order to ensure that all applications may get finite rate and that any of the applications may not starve entirely, utility functions with infinite slope at zero average rate (i.e., at the origin) may be chosen. The slope may reduce as the average rate increases, thus reducing the usefulness of an additional rate as the transmission rate becomes high.

In LTE systems, a scheduler at a mobile station may be based on prioritized bit rates. A token bucket may be implemented for each logical channel (LC) associated with the mobile station. Each LC may be given a priority and a prioritized bit rate (PBR). Tokens may be filled in the token bucket at the PBR. When a grant is made to the mobile terminal for the uplink, packets may be chosen from the LCs in decreasing order of priority. Once an LC is chosen, it may be served such that either the token bucket is empty or a state buffer is empty, or no more bytes may be served using the granted resources. Once, all of the token buckets for all LCs are empty, the scheduler at the mobile station may become a strict priority.

Because it may be desirable to ensure that all mobile terminals get non-zero rate, a utility function for the highest priority LC group (LCG) at a mobile terminal may be chosen such that it has infinite slope at zero rate. The utility functions for all LCGs at the mobile terminal with priority lower than the highest priority LCG may have finite (and not extremely) high slope at zero rate. This may ensure that all mobile terminals in a cell get served. However, if a mobile terminal is at a cell edge and it may not be possible to meet a PBR of its highest priority PBR without very high degradation of service for other mobile terminals, its priority may not increase without bound because its second highest LCG may get a zero rate. Thus, this may allow for lower priority LCGs at each mobile terminal to have zero or very small average rates. For guaranteed bit rate (GBR) flows, a utility function with high slope at rates below the GBR and with low slope at rates above the GBR may be chosen.

Figure 6:
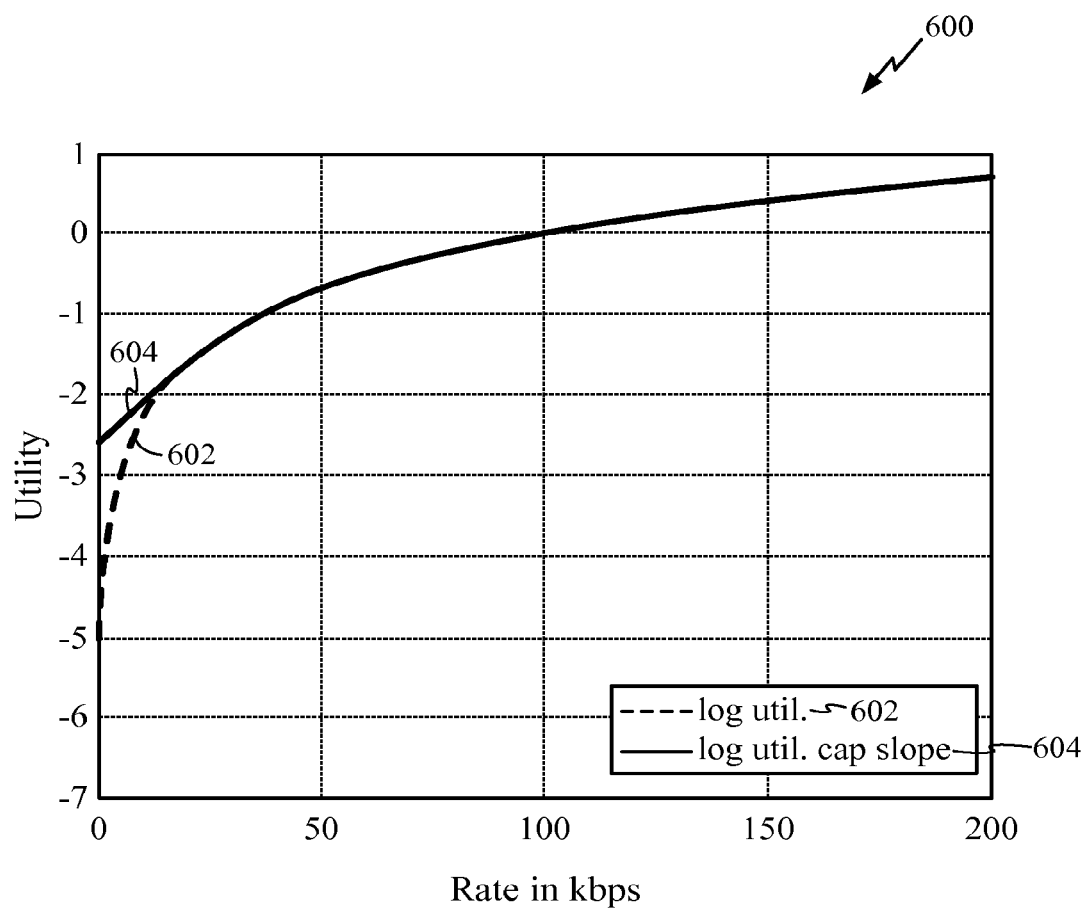
FIG. 6 illustrates an example graph of utility function used by a transmission scheduler for resource allocation in accordance with certain aspects of the present disclosure.
Figure 7:
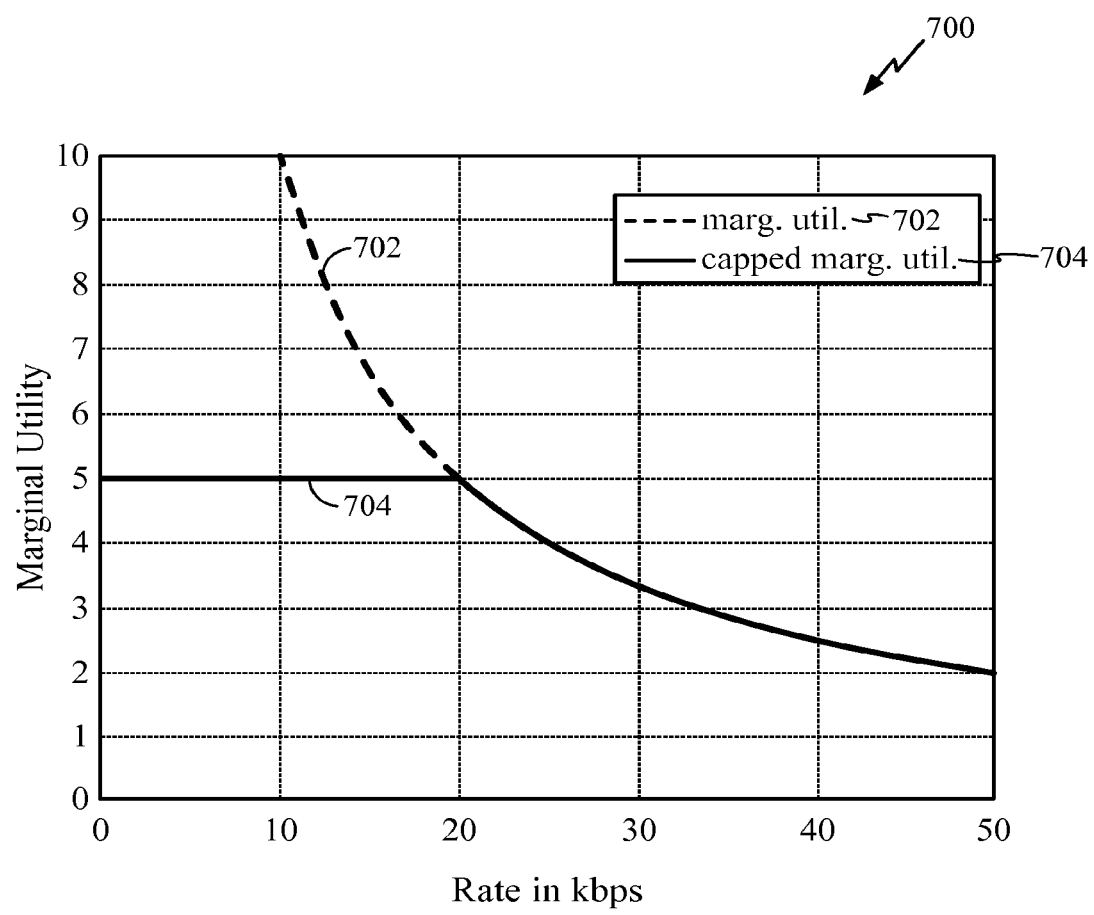
FIG. 7 illustrates an example graph of marginal utility function used by the scheduler for resource allocation in accordance with certain aspects of the present disclosure.

QoS Class Identifier (QCI) parameters (e.g., a guaranteed rate and delay guarantees of a bearer transmission) for a LC may be mapped to a utility function with high/infinite slope at zero average rate. If the LC is not in the higher priority LCG of a mobile terminal, then its slope may be capped at a value depending on one or more of the QCI parameters. For example, a log utility function 602 and its modification 604 with the slope capped at 5 are illustrated in a graph 600 of FIG. 6. FIG. 7 illustrates an example graph 700 of a corresponding marginal utility function 702 and of a capped modification 704 in accordance with certain aspects of the present disclosure. It can be observed that a value of the marginal utility function 704 may be constant for a plurality of transmitting rates.

Figure 8:
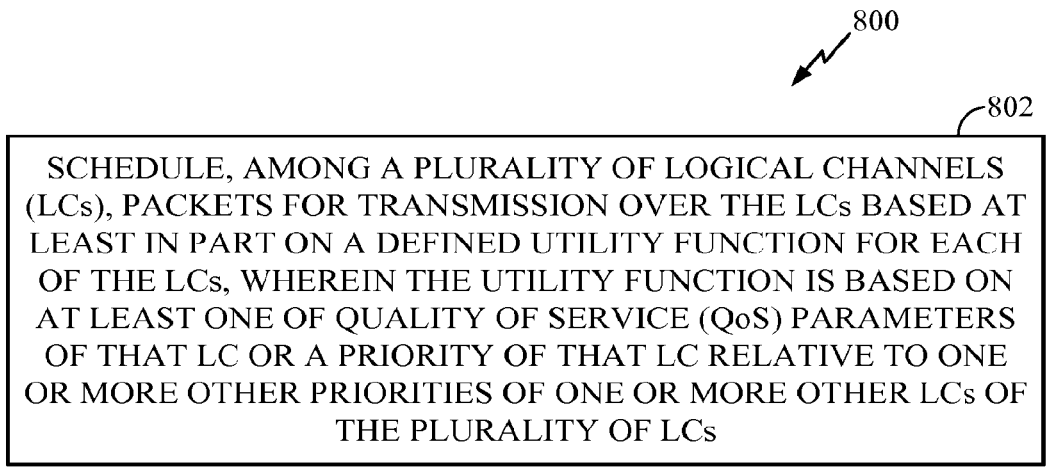
FIG. 8 illustrates example operations that may be executed at a mobile station for scheduling uplink transmissions in accordance with certain aspects of the present disclosure.

FIG. 8 illustrates example operations 800 that may be executed at a mobile station for scheduling uplink transmissions in accordance with certain aspects of the present disclosure. At 802, the mobile station may schedule, among a plurality of logical channels (LCs), packets for transmission over the LCs based at least in part on a defined utility function for each of the LCs. The utility function may be based on at least one of QoS parameters of that LC or a priority of that LC relative to one or more other priorities of one or more other LCs of the plurality of LCs.

Further, the utility function may be chosen based on at least one of: one or more QCI parameters of the LC, a PBR of the LC or a priority of the LC. The PBR and the priority may be configured by a radio resource controller (RRC) operating in accordance to LTE wireless communication standard.

Selection of Utility Functions Based on Priority Metric

In one aspect of the present disclosure, the utility functions may be chosen such that:

$$U''_p(x, x_{PBR}) = K \cdot U''_{p-1}(x, x_{PBR}), \quad (2)$$

for priority level p and some factor K>1. The function of x and $x_{PBR}$ may be a simple ratio (i.e., $x/x_{PBR}$), a ratio of each element squared (i.e., $x^2/x_{PBR}^2$), or some other function.

The factor K from equation (2) may be typically chosen to reflect how much priority may be given to a mobile terminal based on a channel condition versus a priority. If the factor K is higher, then the utility function may become a function of an absolute priority. Then, the prioritization of mobile terminals may be performed using its highest priority LCG for which a PBR may not be met, i.e.:

priority metric=Marginal Utility·Rate=
$$U'_p(x, x_{PBR}) \cdot \text{Rate}, \quad (3)$$

where the parameter Rate from equation (3) may represent a rate when one resource block is allocated. Again, the function of x and $x_{PBR}$ may be a simple ratio (i.e., $x/x_{PBR}$), a ratio of each element squared (i.e., $x^2/x_{PBR}^2$), or some other function.

If the PBRs of all LCGs for a mobile terminal have been met, then its priority may be given by:

$$\text{priority metric}=U'_0(x_{UE}, x_{norm}), \quad (4)$$

where the function of $x_{UE}$ and $x_{norm}$ may be a simple ratio (i.e., $x_{UE}/x_{norm}$), a ratio of each element squared (i.e., $x_{UE}^2/x_{norm}^2$), or some other function. $x_{norm}$ may represent the average rate per mobile terminal, when the PBRs of all mobile terminals have been met. This may be estimated by determining an amount of bandwidth resources left after meeting the PRBs of all LCGs in a cell (on an average) and after distributing the leftover resources in some fair manner (e.g., proportionally) among all the mobile terminals.

Thus, at each sub-frame, one resource block may be assigned at a time for the mobile terminal with the highest value of priority metric defined by equation (4), after which its priority may be recomputed and re-ordered within the priority metric list. The constant K from equation (2) may be chosen such that to tradeoff spectral efficiency with fairness. A large value of K may bias the wireless communication system to strict priority across LCGs, even across mobile terminals, while a smaller constant may favor a mobile terminal, which may either have a good channel towards a serving base station or an associated LCG with a low average rate (compared to the PBR).

Figure 5A:
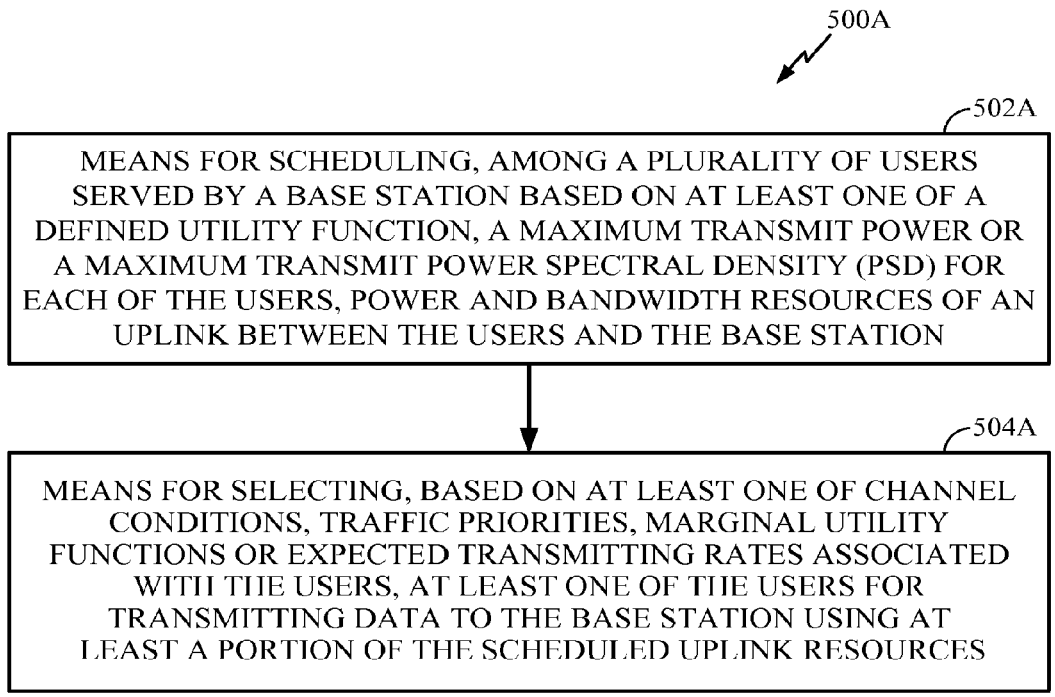
FIG. 5A illustrates example components capable of performing the operations illustrated in FIG. 5.
Figure 8A:
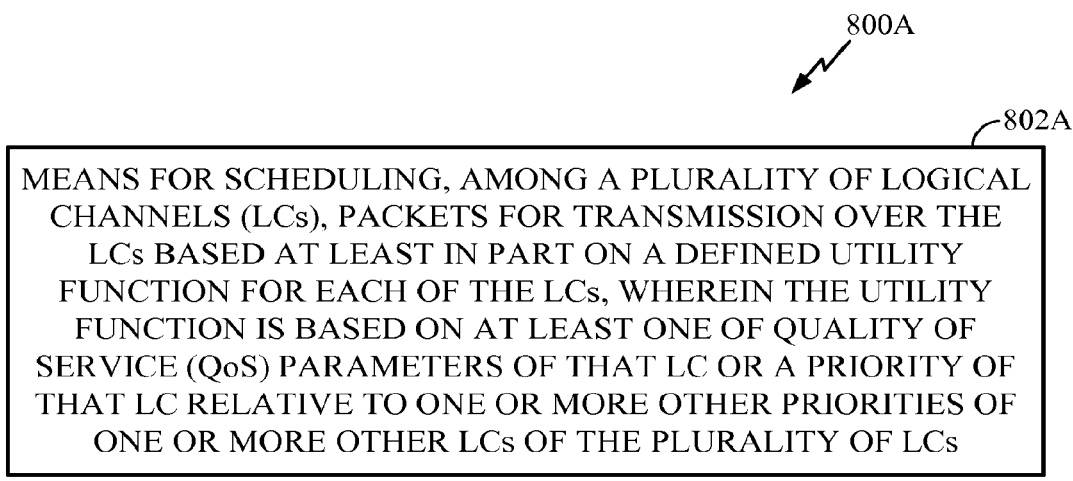
FIG. 8A illustrates example components capable of performing the operations illustrated in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500 and 800 illustrated in FIG. 5 and FIG. 8 correspond to components 500A and 800A illustrated in FIG. 5A and FIG. 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

APPENDIX

The appendix provides details on a bisection method for maximization of a sum of concave functions with a single affine constraint. This method may be applied to solve the optimization problem defined in equation (1) of the disclosure. The following optimization problem can be considered over n variables $x_i$, i=1, ..., n, and it may correspond to the optimization problem given by equation (1):

$$\max\left\{\sum_i U_i(x_i)\right\} \text{ subject to } \sum_i a_i x_i \leq c, x_i > 0, \forall i, \quad (5)$$

where $U_i$, i=1, ..., n are concave strictly increasing differentiable functions defined on the positive orthant. The constants c and $a_i$, i=1, ..., n may be positive.

In order to solve the optimization problem given by equation (5), the following bisection search algorithm on a dual variable may be used to obtain the optimal vector x.

The algorithm may be initialized as:

$$\lambda^{infeas} = \min_i \frac{1}{a_i} U'_i(c), \lambda^{feas} = \min_i \frac{1}{a_i} U'_i\left(\frac{c}{n}\right). \quad (6)$$

After that, while $\lambda^{feas} - \lambda^{infeas} \epsilon$, the following may be computed:

$$\lambda = \frac{\lambda^{feas} + \lambda^{infeas}}{2}, \quad (7)$$

$$x_i = U_i'^{-1}(a_i\lambda). \quad (8)$$

If $\sum_i a_i x_i \le c$, then $\lambda = \lambda^{feas}$, otherwise $\lambda = \lambda^{infeas}$.

The complexity of the above algorithm may be equal to $O(n \log \epsilon)$. In practice, about 15 iterations may be typically sufficient.

Suitable modifications of the aforementioned algorithm may be required to obtain the optimal solution when the utility functions $U_i$, $i=1, \ldots, n$ may be continuous but not differentiable (i.e., continuous non-differentiable objective). The step in the above algorithm defined by equation (7) may need to be modified because $U'_i(x_i)$ may not be defined for all positive $x_i$. Hence, equation (7) may need to be modified as follows:

$$x_i : a_i \cdot \lambda \in \partial U_i(x_i), \quad (9)$$

i.e., $a_i \cdot \lambda$ may belong to a set of sub-gradients of $U_i$ at $x_i$. It should be noted that when a function is differentiable, then a derivative of the function may be identical to a sub-gradient of the function.

The invention claimed is:

1. A method for wireless communications, comprising:
scheduling, by a user equipment (UE), among a plurality of logical channels (LCs) associated with the UE, packets for transmission over the LCs based at least in part on a defined utility function and a marginal utility function for each of the LCs,
wherein a value of at least one of the marginal utility functions is constant for transmitting rates below a threshold transmitting rate and not constant for transmitting rates above the threshold transmitting rate; and
the utility function for each of the LCs is based on at least one of:
an average rate of that LC and at least one Quality of Service (QoS) parameter of that LC, or
a priority of that LC relative to one or more other priorities of one or more other LCs of the plurality of LCs.

2. The method of claim 1, wherein the utility function for each of the LCs is chosen based on at least one of: one or more QoS Class Identifier (QCI) parameters of the LC, a prioritized bit rate (PBR) of the LC, or the priority of the LC.

3. The method of claim 2, wherein the PBR and the priority are configured by a radio resource controller (RRC) operating in accordance to Long Term Evolution (LTE) wireless communication standard.

4. The method of claim 1, wherein:
the utility functions are defined for flows of the packets to be transmitted with a Guaranteed Bit Rate (GBR), and
each of the utility functions has a large slope for rates less than the GBR and a smaller slope for rates greater than the GBR.

5. The method of claim 1, wherein the utility function for each of the LCs is a function of one or more QoS Class Identifier (QCI) parameters defined for a bearer transmission over the LC.

6. A user equipment (UE) for wireless communications, comprising:
means for scheduling, among a plurality of logical channels (LCs) associated with the UE, packets for transmission over the LCs based at least in part on a defined utility function and a marginal utility function for each of the LCs, and
means for communication with a base station based on the scheduling;
wherein a value of at least one of the marginal utility functions is constant for transmitting rates below a threshold transmitting rate and not constant for transmitting rates above the threshold transmitting rate; and
the utility function for each of the LCs is based on at least one of:
an average rate of that LC and at least one Quality of Service (QoS) parameter of that LC, or
a priority of that LC relative to one or more other priorities of one or more other LCs of the plurality of LCs.

7. The UE of claim 6, wherein the utility function for each of the LCs is chosen based on at least one of: one or more QoS Class Identifier (QCI) parameters of the LC, a prioritized bit rate (PBR) of the LC, or the priority of the LC.

8. The UE of claim 7, wherein the PBR and the priority are configured by a radio resource controller (RRC) operating in accordance to Long Term Evolution (LTE) wireless communication standard.

9. The UE of claim 6, wherein:
the utility functions are defined for flows of the packets to be transmitted with a Guaranteed Bit Rate (GBR), and
each of the utility functions has a large slope for rates less than the GBR and a smaller slope for rates greater than the GBR.

10. The UE of claim 6, wherein the utility function for each of the LCs is a function of one or more QoS Class Identifier (QCI) parameters defined for a bearer transmission over the LC.

11. A user equipment (UE) for wireless communications, comprising:
a scheduler configured to schedule, among a plurality of logical channels (LCs) associated with the UE, packets for transmission over the LCs based at least in part on a defined utility function and a marginal utility function for each of the LCs,
wherein a value of at least one of the marginal utility functions is constant for transmitting rates below a threshold transmitting rate and not constant for transmitting rates above the threshold transmitting rate; and
the utility function for each of the LCs is based on at least one of:
an average rate of that LC and at least one Quality of Service (QoS) parameter of that LC, or
a priority of that LC relative to one or more other priorities of one or more other LCs of the plurality of LCs.

12. The UE of claim 11, wherein the utility function for each of the LCs is chosen based on at least one of: one or more QoS Class Identifier (QCI) parameters of the LC, a prioritized bit rate (PBR) of the LC, or the priority of the LC.

13. The UE of claim 11, wherein:
the utility functions are defined for flows of the packets to be transmitted with a Guaranteed Bit Rate (GBR), and
each of the utility functions has a large slope for rates less than the GBR and a smaller slope for rates greater than the GBR.

14. A computer-program product for wireless communications, stored on a non-transitory computer readable medium and comprising instructions executable by one or more processors to:
schedule, by a user equipment (UE), among a plurality of logical channels (LCs) associated with the UE, packets for transmission over the LCs based at least in part on a defined utility function and a marginal utility function for each of the LCs, wherein a value of at least one of the marginal utility functions is constant for transmitting rates below a threshold transmitting rate and not constant for transmitting rates above the threshold transmitting rate; and the utility function for each of the LCs is based on at least one of:
- an average rate of that LC and at least one Quality of Service (QoS) parameter of that LC, or
- a priority of that LC relative to one or more other priorities of one or more other LCs of the plurality of LCs.

15. The computer-program product of claim 14, wherein the utility function for each of the LCs is chosen based on at least one of: one or more QoS Class Identifier (QCI) parameters of the LC, a prioritized bit rate (PBR) of the LC, or the priority of the LC.

16. The computer-program product of claim 14, wherein:
the utility functions are defined for flows of the packets to be transmitted with a Guaranteed Bit Rate (GBR), and
each of the utility functions has a large slope for rates less than the GBR and a smaller slope for rates greater than the GBR.

17. A user equipment (UE) for wireless communications, comprising:
at least one processor configured to:
schedule, among a plurality of logical channels (LCs) associated with the UE, packets for transmission over the LCs based at least in part on a defined utility function and a marginal utility function for each of the LCs,
wherein a value of at least one of the marginal utility functions is constant for transmitting rates below a threshold transmitting rate and not constant for transmitting rates above the threshold transmitting rate; and
the utility function for each of the LCs is based on at least one of:
- an average rate of that LC and at least one Quality of Service (QoS) parameter of that LC, or
- a priority of that LC relative to one or more other priorities of one or more other LCs of the plurality of LCs; and
a memory coupled to the at least one processor.

18. The UE of claim 17, wherein the utility function for each of the LCs is chosen based on at least one of: one or more QoS Class Identifier (QCI) parameters of the LC, a prioritized bit rate (PBR) of the LC, or the priority of the LC.

19. The UE of claim 17, wherein:
the utility functions are defined for flows of the packets to be transmitted with a Guaranteed Bit Rate (GBR), and
each of the utility functions has a large slope for rates less than the GBR and a smaller slope for rates greater than the GBR.

20. The method of claim 1, wherein at least one of the utility functions has infinite slope when the average rate of that LC is zero.

21. The UE of claim 6, wherein at least one of the utility functions has infinite slope when the average rate of that LC is zero.

22. The UE of claim 11, wherein at least one of the utility functions has infinite slope when the average rate of that LC is zero.

23. The computer-program product of claim 14, wherein at least one of the utility functions has infinite slope when the average rate of that LC is zero.

24. The UE of claim 17, wherein at least one of the utility functions has infinite slope when the average rate of that LC is zero.

* * * * *